United States Patent
Inami et al.

(10) Patent No.: US 10,018,222 B2
(45) Date of Patent: Jul. 10, 2018

(54) SLIDING MEMBER

(71) Applicant: DAIDO METAL COMPANY LTD., Nagoya-shi, Aichi (JP)

(72) Inventors: Shigeru Inami, Inuyama (JP); Tetsuya Ogawa, Inuyama (JP); Tadatoshi Nagasaki, Inuyama (JP)

(73) Assignee: DAIDO METAL COMPANY LTD., Naka-Ku, Nagoya-Shi, Aichi (JP)

( * ) Notice: Subject to any disclaimer, the term of this patent is extended or adjusted under 35 U.S.C. 154(b) by 0 days.

(21) Appl. No.: 15/523,468

(22) PCT Filed: Feb. 24, 2016

(86) PCT No.: PCT/JP2016/055443
§ 371 (c)(1),
(2) Date: May 1, 2017

(87) PCT Pub. No.: WO2016/174910
PCT Pub. Date: Nov. 3, 2016

(65) Prior Publication Data
US 2017/0314614 A1    Nov. 2, 2017

(30) Foreign Application Priority Data

Apr. 27, 2015 (JP) .................................. 2015-090319
May 11, 2015 (JP) .................................. 2015-096436

(51) Int. Cl.
*F16C 33/20* (2006.01)
*F16C 17/02* (2006.01)

(52) U.S. Cl.
CPC .............. *F16C 17/02* (2013.01); *F16C 33/20* (2013.01); *F16C 33/206* (2013.01); *F16C 2360/22* (2013.01)

(58) Field of Classification Search
CPC .......... F16C 17/02; F16C 17/04; F16C 33/20; F16C 33/203; F16C 33/205; F16C 33/206; F16C 33/208; F16C 2360/22
See application file for complete search history.

(56) References Cited

U.S. PATENT DOCUMENTS 6,802,650 B2 * 10/2004 Yasuda ..................... F16C 3/08
  384/276
8,727,622 B2 * 5/2014 Kurata .................. F16C 33/125
  384/13

(Continued)

FOREIGN PATENT DOCUMENTS

JP    H08128447 A      5/1996
JP    2003184883 A  *  7/2003  ................ F16C 3/08

(Continued)

OTHER PUBLICATIONS

International Search Report dated May 17, 2016, for International Patent Application No. PCT/JP2016/055443.

*Primary Examiner* — Phillip A Johnson
(74) *Attorney, Agent, or Firm* — Karceski IP Law, PLLC

(57) ABSTRACT

A resin coating layer in a sliding member has a surface shape indicated by a shape line. This shape line is divided into recessed sections and protruding sections by an average line for uneven areas. The inclination R of a straight line connecting the bottom of these recessed sections and the peak of these protruding sections is classified into Ra: $R<0.02$, Rb: $0.02 \leq R \leq 0.04$, and Rc: $0.04<R$. The sliding member comprises a resin coating layer fulfilling $Ra+Rb \geq 50\%$.

16 Claims, 6 Drawing Sheets

(56) References Cited

U.S. PATENT DOCUMENTS

2002/0090155 A1* 7/2002 Ushijima .................. F02F 1/20
                                                    384/293
2015/0049966 A1* 2/2015 Sato ........................ F16C 33/14
                                                     384/42

FOREIGN PATENT DOCUMENTS

| JP | 2012073142 A | 4/2012 | | |
|----|--------------|--------|---|---|
| JP | 2012177439 A | 9/2012 | | |
| JP | 2014070662 A | 4/2014 | | |
| JP | 2014156927 A | 8/2014 | | |
| WO | WO-2016174909 A1 * | 11/2016 | ............... | F16C 17/04 |

* cited by examiner

|  |  | GRADIENT R | | | L(Ra)+L(Rb) | $\frac{L(Rb)}{L(Ra)+L(Rb)}$ | COEFFICIENT OF FRICTION |
|---|---|---|---|---|---|---|---|
|  |  | L(Ra) % | L(Rb) % | L(Rc) % | % | % |  |
| EXAMPLES | 1 | 26 | 24 | 50 | 50 | 48 | 0.038 |
|  | 2 | 51 | 49 | 0 | 100 | 49 | 0.035 |
|  | 3 | 100 | 0 | 0 | 100 | 0 | 0.037 |
|  | 4 | 50 | 0 | 50 | 50 | 0 | 0.040 |
|  | 5 | 60 | 20 | 20 | 80 | 25 | 0.038 |
|  | 6 | 25 | 25 | 50 | 50 | 50 | 0.029 |
|  | 7 | 0 | 50 | 50 | 50 | 100 | 0.027 |
|  | 8 | 0 | 100 | 0 | 100 | 100 | 0.025 |
|  | 9 | 50 | 50 | 0 | 100 | 50 | 0.026 |
|  | 10 | 20 | 50 | 30 | 70 | 71 | 0.024 |
|  | 11 | 40 | 40 | 20 | 80 | 50 | 0.015 |
|  | 12 | 10 | 70 | 20 | 80 | 88 | 0.014 |
|  | 13 | 10 | 90 | 0 | 100 | 90 | 0.012 |
|  | 14 | 40 | 60 | 0 | 100 | 60 | 0.013 |
|  | 15 | 30 | 55 | 15 | 85 | 65 | 0.011 |
|  | 16 | 15 | 80 | 5 | 95 | 84 | 0.011 |
|  | 17 | 20 | 70 | 10 | 90 | 78 | 0.010 |
| COMPARATIVE EXAMPLES | 1 | 24 | 25 | 51 | 49 |  | 0.055 |
|  | 2 | 49 | 0 | 51 | 49 |  | 0.057 |
|  | 3 | 0 | 49 | 51 | 49 |  | 0.056 |

FIG. 7

SLIDING MEMBER

CROSS-REFERENCE TO RELATED APPLICATIONS

This is a National Stage Entry into the United States Patent and Trademark Office from International PCT Patent Application No. PCT/JP2016/055443, having an international filing date of Feb. 24, 2016, and which claims priority to both Japanese Patent Application No. 2015-090319, filed Apr. 27, 2015, and to Japanese Patent Application No. 2015-096436, filed May 11, 2015, the entire contents of all of which are incorporated herein by reference.

FIELD OF THE INVENTION

The present invention relates to a sliding member.

BACKGROUND OF THE INVENTION

A rotating shaft member needs to be supported not only in the rotational direction of the shaft member but also in the axial direction thereof. As a bearing member that supports the shaft member in the axial direction, a thrust washer, such as that disclosed in Japanese Patent Laid-Open No. 2014-070662 ("JP '662"), is known. The thrust washer supports the axial load of the rotating shaft member. The thrust washer disclosed in JP '662 has a resin coating layer on the slide surface in contact with the shaft member. In JP '662, the resin coating layer has a central portion raised higher than both radial ends of the thrust washer in a cross section taken along the radial direction, that is, a cross section extending in the direction from the inner circumferential side toward the outer circumferential side. The thus shaped resin coating layer having the varying macroscopic thickness allows reduction in local contact between the shaft member and the thrust washer and damage resulting from the contact.

Internal combustion engine or the like including a bearing member and a shaft member, that is, a sliding member and a counterpart member require higher performance and more advanced functions these days. These requirements cause tendencies such as reduced rigidity of the shaft member caused by reduced weight of the shaft member, increased contact pressure exerted between the shaft member and the bearing member, etc. In particular, an internal combustion engine repeats stopping and starting the operation thereof in order to reduce fuel consumption in recent years. Therefore, the chances of the shaft member and the bearing member coming into contact with each other via insufficiently thick oil film increase, and thus, frictional resistance tends to increase. As a result, it is further required to reduce the friction between the shaft member and the bearing member.

SUMMARY OF THE INVENTION

An object of the present invention is to provide a sliding member that allows further reduction in friction.

To achieve the object described above, a sliding member according to an embodiment of the present invention includes a base layer and a resin coating layer provided on a slide surface of the base layer.

A shape line is so defined as to represent a shape of a surface of the resin coating layer disposed on a side opposite the base layer by using an X-Y coordinate system formed of an X axis representing a position between arbitrary two points on the surface and a Y axis perpendicular to the X axis and representing a thickness direction of the resin coating layer, the shape line is divided by an imaginary straight line parallel to the X axis to set recessed regions that protrude downward from the imaginary straight line and protruding regions that protrude upward from the imaginary straight line, and the imaginary straight line so positioned that a sum of areas of the recessed regions is equal to a sum of areas of the protruding regions is defined as a protrusion/recess average line, regions that protrude downward from the protrusion/recess average line are defined as recesses, and regions that protrude upward from the protrusion/recess average line are defined as protrusions, for each set of a recess out of the recesses and a protrusion out of the protrusions that are adjacent to each other with an intersection of the shape line and the protrusion/recess average line sandwiched between the recess and the protrusion, a bottom that is a lowest point of the recess and a peak that is a highest point of the protrusion are connected to each other with an imaginary straight line L, and a gradient of the straight line L is defined as a gradient R, a determined value of the gradient R is classified into
Ra: $R<0.02$,
Rb: $0.02 \le R \le 0.04$, and
Rc: $0.04<R$, and assuming that a total number of the straight lines L with the gradients R thereof calculated corresponds to 100%, $$L(Ra)+L(Rb) \ge 50\% \text{ is satisfied.}$$

In the above expression, L(Ra) represents the proportion of straight lines each having a gradient classified into Ra, assuming that the total number of the straight lines L with the gradients R thereof calculated corresponds to 100%. The same holds true for L(Rb) and L(Rc). The Y axis represents the thickness direction of the resin coating layer and is perpendicular to the X axis.

The present inventors have found that the gradients R of the straight lines L, which connect the recesses and the protrusions defined as described above to each other, affects the friction against a counterpart member and formation of an oil film. That is, greater gradients R of the straight lines L, which connect the bottoms of the recesses and the peaks of the protrusions to each other, tend to allow a lubricant for lubrication held in the recesses to remain in the recesses by a larger amount. On the other hand, when the gradients R are too large, the protrusions having the too large gradients R prevent the lubricant held in the recesses from moving. The restricted movement therefore tends to prevent the lubricant held in the recesses from being smoothly supplied to the peaks of the protrusions and inhibit formation of an oil film, for example, when sliding movement starts, such as when an internal combustion engine starts. Further, when the gradients R are too large, the contact resistance between the resin coating layer and a counterpart member increases, and the friction therebetween increases accordingly. On the other hand, smaller gradients R of the straight lines L cause the amount of lubricant held in the recesses to be more insufficient. That is, when the gradients R are too small, the inclining surfaces that connect the recesses and the protrusions to each other become gentle, so that the lubricant readily flows out along the slide surface. It is therefore difficult for the recesses to hold a sufficient amount of lubricant. Controlling the gradients R of the straight lines L defined in the resin coating layer therefore allows the friction against the counterpart member to be controlled.

When the gradients R are classified into Ra: $R<0.02$, Rb: $0.02 \le R \le 0.04$, and Rc: $0.04<R$, controlling the gradients R to satisfy L(Ra)+L(Rb)≥50% allows friction against the counterpart member to be reduced. Further, it is preferable that 70%≤L(Ra)+L(Rb)≤95% is satisfied.

The sliding member according to the present embodiment preferably satisfies L(Rb)/(L(Ra)+L(Rb))≥50%. The value on the right side of the above expression is a percentage representation of the quotient of numerator on the left side of the expression divided by the denominator on the left side of the expression. Controlling the gradients R of the straight lines L as described above achieves a shape appropriate for formation of an oil film. The friction against the counterpart member can therefore be further reduced. Further, it is more preferable that 60%≤L(Rb)/(L(Ra)+L(Rb))≤90% is satisfied.

Further, assuming that the total number of the straight lines L with the gradients R thereof calculated corresponds to 100%, the sliding member according to the present embodiment preferably satisfies 10%≤L(Ra)≤40%, 40%≤L(Rb)≤90%, and 0%≤L(Rc)≤20%.

The inventors of the present application have clarified that controlling the gradients R of the straight lines L in the slide surface as described above achieves a slide surface shape that allows an oil film to be readily formed. Controlling the shape of the slide surface as described above allows the friction against the counterpart member to be further reduced. Further, it is more preferable that 15%≤L(Ra)≤30%, 55%≤L(Rb)≤80%, 5%≤L(Rc)≤15% are satisfied.

Further, L(Rb)/L(Ra)≥150% is preferably satisfied from a viewpoint of stability of quality of the sliding member. L(Ra)/L(Rc)≤300% is preferably satisfied from a viewpoint of a manufacturing cost. L(Rb)/L(Rc)≥200% is preferably satisfied from a viewpoint of reduction in the coefficient of friction.

The resin coating layer having the configuration described above is useful in contributing to reduction of friction on a slide portion.

Further, the resin coating layer having the configuration described above is preferably formed by using a paint having a controlled aggregation state of additive particles.

An internal combustion engine provided with the sliding member described above exhibits reduced coefficient of friction and thus, is also suitable for applications in which stopping and starting of the operation is repeated.

BRIEF DESCRIPTION OF THE DRAWINGS

FIG. 7 shows examples of the sliding member according to the embodiment.

DESCRIPTION OF EMBODIMENTS OF THE INVENTION

An embodiment of a sliding member will be described below with reference to the drawings.

Figure 1:
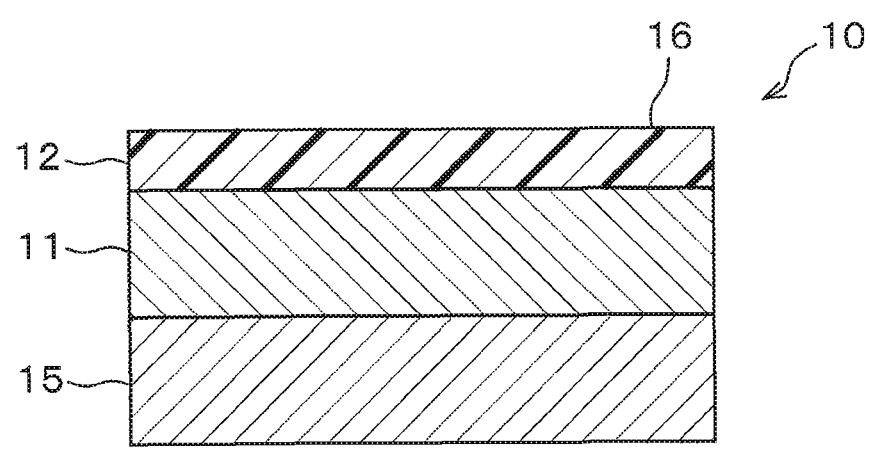
FIG. 1 is a diagrammatic view showing a cross section of a sliding member according to an embodiment.
Figure 2:
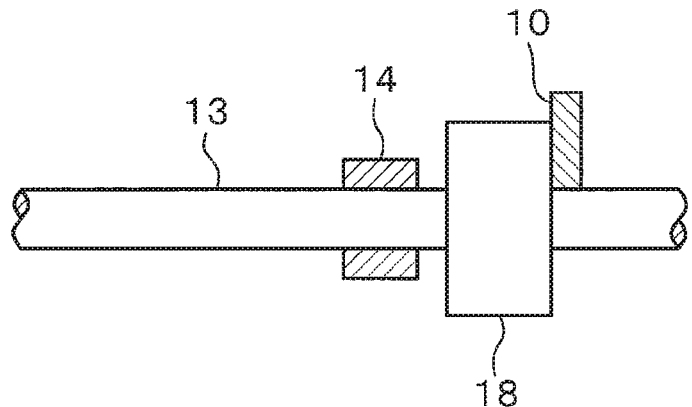
FIG. 2 is a diagrammatic view showing an example of a bearing apparatus in which the sliding member according to the embodiment is used as a thrust washer.
Figure 3:
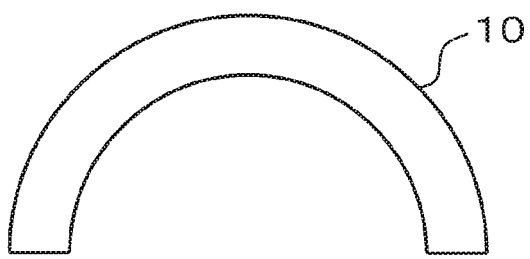
FIG. 3 is a diagrammatic view showing a halved thrust washer using the sliding member according to the embodiment.

A sliding member 10 includes a base layer 11 and a resin coating layer 12, as shown in FIG. 1. The resin coating layer 12 is provided on a slide surface of the base layer 11, that is, on the side facing a counterpart member. The resin coating layer 12 is formed on the slide surface of the base layer 11 and has a macroscopically uniform thickness. In the present embodiment, the sliding member 10 is a bearing member and slides on a shaft member 13, as shown in FIG. 2. In particular, the sliding member 10 is preferably used as a thrust washer, which receives force acting in the axial direction of the shaft member 13, in the present embodiment. That is, in the case shown in FIG. 2, the shaft member 13 moves not only in the rotational direction but also in the axial direction. The shaft member 13 is therefore not only rotatably supported by a rotary bearing 14 but also axially supported while rotating against the sliding member 10 serving as a thrust washer. The sliding member 10, when used as a thrust washer, is formed in a semicircular ring shape, such as the halved shape shown in FIG. 3, or a full ring shape. The sliding member 10 is placed in contact with an axial end surface of a thrust collar 18 of the shaft member 13 and axially supports the shaft member 13. The thrust washer formed of the sliding member 10 and shown in FIG. 3 is presented as an example. That is, the sliding member 10 is not necessarily the thrust washer having the shape shown in FIG. 3 and may be a plate-shaped thrust washer, may be integrated with a rotary bearing, or may be any of thrust washers having a variety of known shapes, such as a grooved washer, for example, a tapered land groove, and a shape having a thickness that changes toward the circumferential edge, for example, a shape with a relief portion.

The sliding member according to the present embodiment may be used as a shaft member, meaning that the sliding member may be used as at least one of the bearing member and the counterpart member.

In the case where the sliding member according to the present embodiment is used as a bearing member, a bearing alloy layer 11, which is the base layer of the sliding member 10 shown in FIG. 1, is made, for example, of an aluminum alloy or a copper alloy. The sliding member 10 may further include a back metal layer 15, which is integrated with the bearing alloy layer 11. In this case, the sliding member 10 may include an intermediate layer that is not shown but located between the bearing alloy layer 11 and the back metal layer 15. Further, the sliding member 10 may have a multilayer structure having more than three layers by adding another layer to the bearing alloy layer 11, the back metal layer 15, and the intermediate layer.

Figure 4:
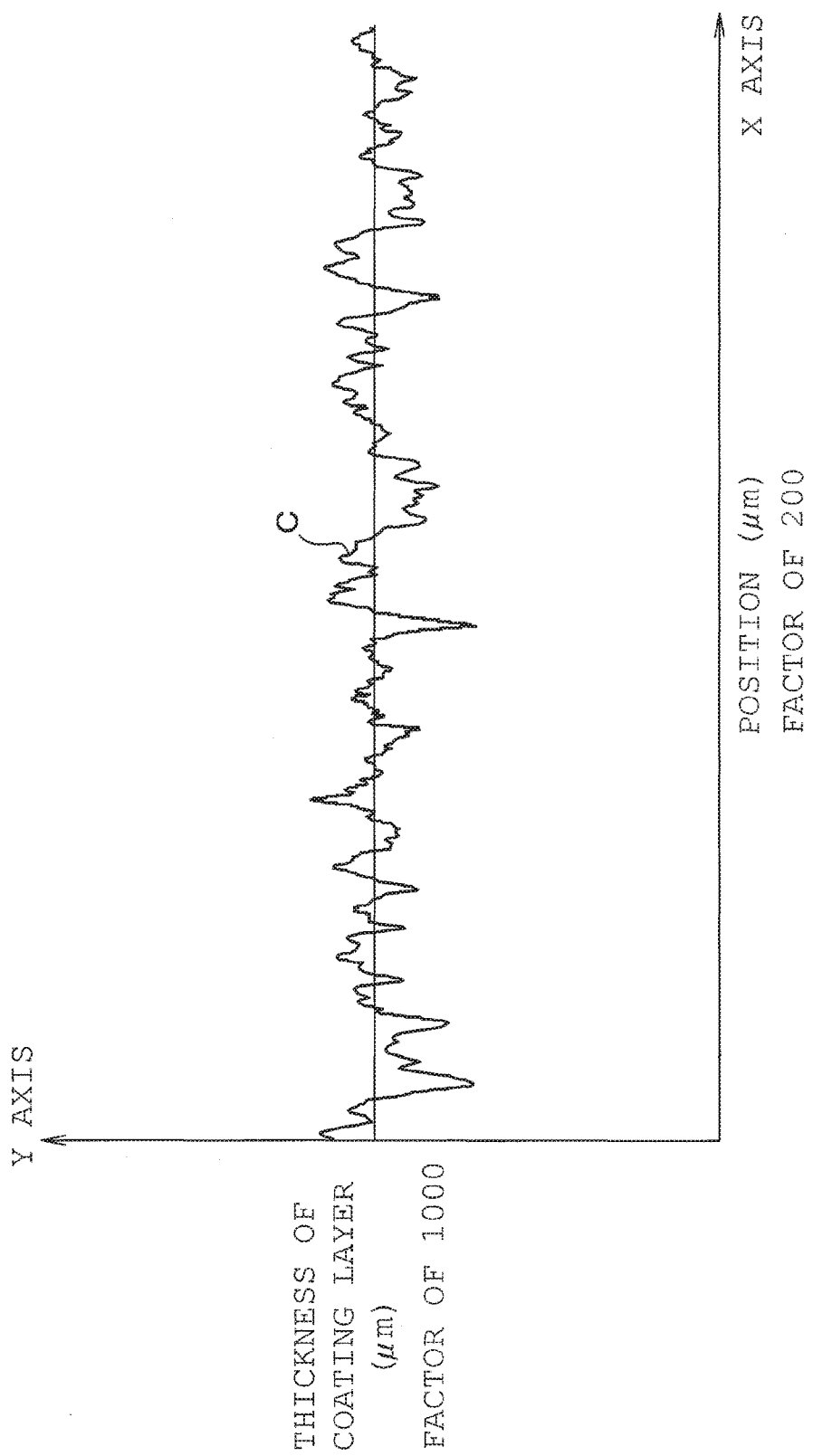
FIG. 4 is a diagrammatic view showing the shape line of the surface of a resin coating layer of the sliding member according to the embodiment.

As described above, the resin coating layer 12, covering the bearing alloy layer 11, is provided with microscopically minute protrusions and recesses on a surface 16 serving as the slide surface, without varying the macroscopic film thickness of the resin coating layer 12 itself. The surface 16 is a surface of the resin coating layer 12 disposed on the side opposite the bearing alloy layer 11, as shown in FIG. 1. The surface shape of the resin coating layer 12 is acquired as a shape line C shown in FIG. 4. The shape line C represents the protrusions and recesses of the surface of the resin coating layer 12. The shape line C is expressed by using an X-Y coordinate system. Specifically, the X axis represents a position between two arbitrary points and the Y axis represents the thickness direction of the resin coating layer 12. Thus, a position in the Y-axis direction represents the depth and height of the protrusions and recesses of the surface 16. The shape line C therefore contains protrusions and recesses following the surface shape of the resin coating layer 12. FIG. 4 is an enlarged view with the X axis enlarged by a factor of 200 and the Y axis enlarged by a factor of 1000.

Figure 5:
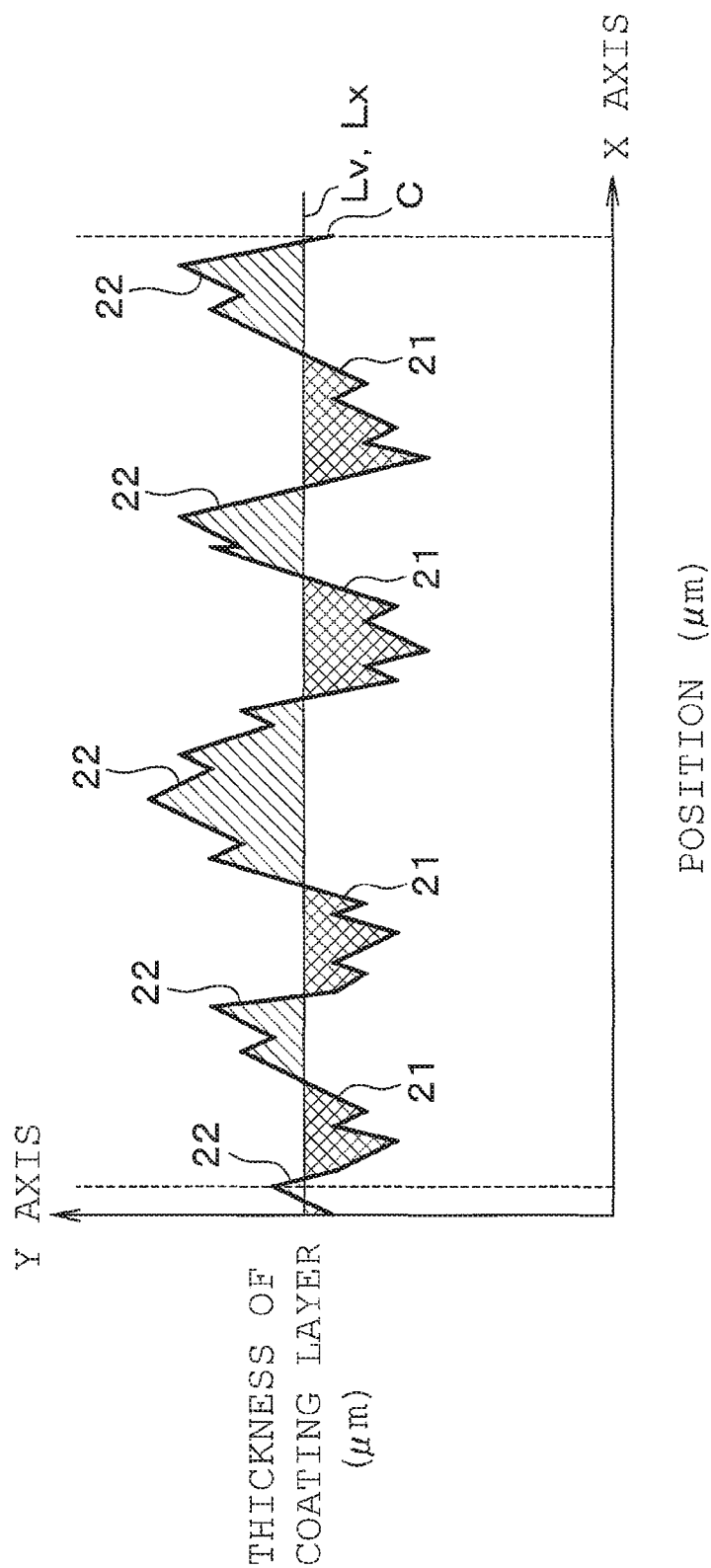
FIG. 5 is a diagrammatic view showing a simplified version of the shape line shown in FIG. 4 for the convenience of explanation.

FIG. 5 diagrammatically shows a simplified version of the shape line C shown in FIG. 4 for convenience of explanation. The shape line C containing protrusions and recesses is divided into upper and lower parts in the Y-axis direction by an imaginary straight line Lx, which is parallel to the X axis serving as a reference. In a case where the surface 16 of the resin coating layer 12 is microscopically flat, the surface 16 of the resin coating layer 12, the X axis, and the imaginary straight line Lx are parallel to one another. When the shape line C is divided by the imaginary straight line Lx, recessed regions that protrude downward from the imaginary straight line Lx and protruding regions that protrude upward from the imaginary straight line Lx become divided from each other. In FIG. 5, the recessed regions are "meshed," and the protruding regions are "hatched." The imaginary straight line Lx, which is so positioned that the sum S1 of the areas of the recessed regions is equal to the sum S2 of the areas of the protruding regions, is defined as a protrusion/recess average line Lv. That is, across the surface 16 of the resin coating layer 12, the sum S1 of the areas of the recessed regions that protrude downward from the protrusion/recess average line Lv is equal to the sum S2 of the areas of the protruding regions that protrude upward from the protrusion/recess average line Lv (S1=S2). The regions that protrude downward from the protrusion/recess average line Lv are defined as recesses 21, and the regions that protrude upward from the protrusion/recess average line Lv are defined as protrusions 22.

Figure 6:
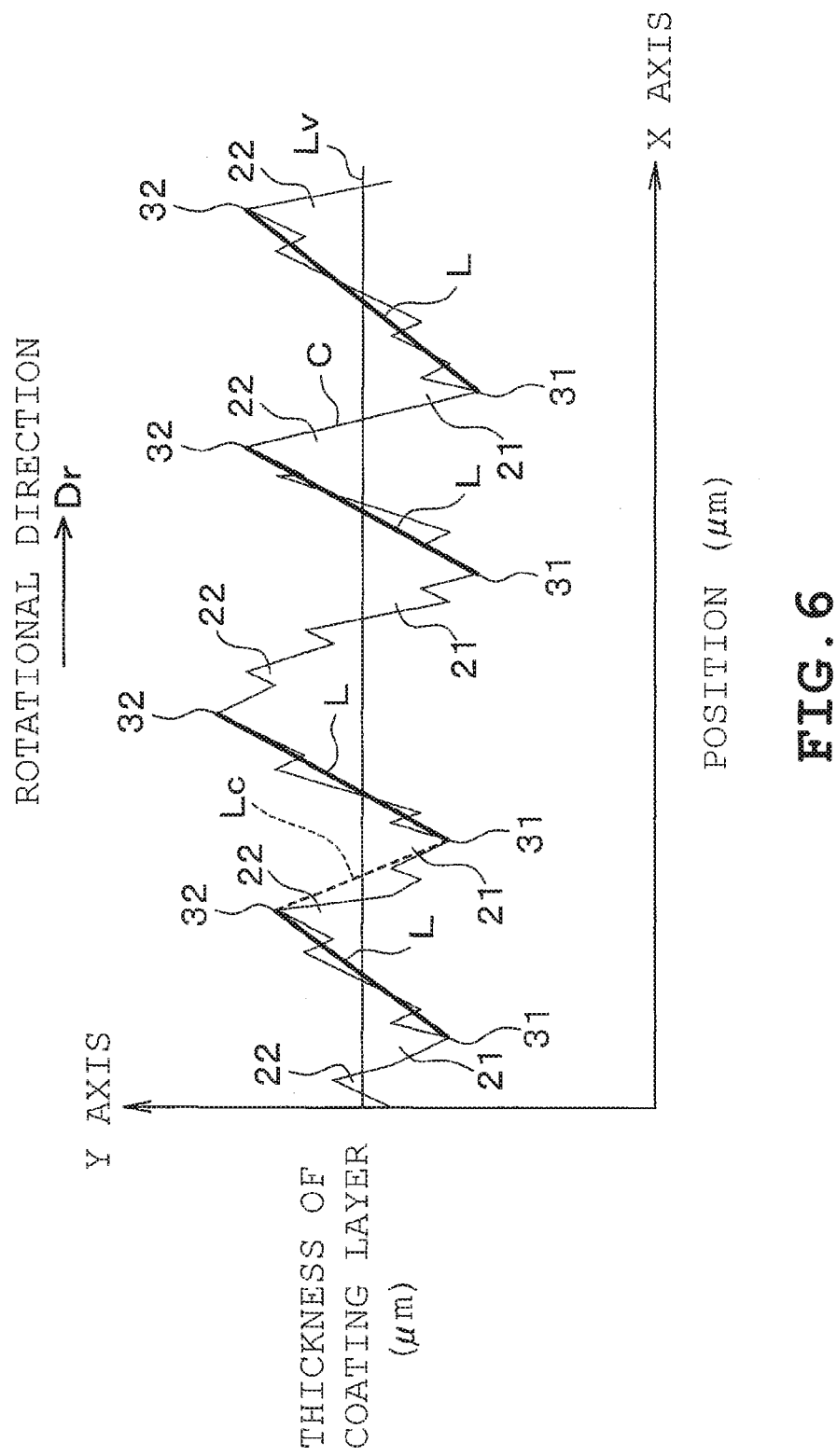
FIG. 6 is a diagrammatic view showing straight lines that connect the bottoms of recesses and the peaks of protrusions to each other along the shape line shown in FIG. 4.

In the present embodiment, the performance of the sliding member 10 is verified by using the gradients R of the straight lines L set between the recesses 21 and the protrusions 22. The shape line C intersects the protrusion/recess average line Lv at the boundary between the recesses 21 and the protrusions 22, as shown in FIG. 6. Each of the recesses 21 has a bottom 31 at the lowest point, that is, in a position closest to the bearing alloy layer 11. Each of the protrusions 22 has a peak 32 at the highest point, that is, in a position farthest from the bearing alloy layer 11. As described above, when a recess 21 and a protrusion 22 are adjacent to each other with the protrusion/recess average line Lv therebetween, the bottom 31 of the recess 21 and the peak 32 of the protrusion 22 can be connected to each other with an imaginary straight line L. The thus drawn straight line L is an imaginary straight line that connects the bottom 31 of the recess 21 and the peak 32 of the protrusion 22 to each other. The straight line L has a gradient R. The gradient R of the straight line L changes depending on the positional relationship between the bottom 31 of the recess 21 and the peak 32 of the protrusion 22. The gradient R is the value calculated by dividing a measured distance between the bottom 31 and the peak 32 in the Y-axis direction by a measured distance between the bottom 31 and the peak 32 in the X-axis direction. In the present embodiment, the performance of the sliding member 10 is verified by using the gradient R. In the present embodiment, in particular, the imaginary straight line L is so set as to be oriented forward in the direction of relative movement between the sliding member 10 and the shaft member 13, which is the counterpart member. The straight line that connects the bottom 31 of a recess 21 and the peak 32 of a protrusion 22 to each other is not limited to the straight line L, but a straight line Lc can be set, as indicated by the broken line in FIG. 6. In the present embodiment, the rotational direction, which is the direction of the relative movement, is identified as a rotational direction Dr, as shown in FIG. 6, and the verification is performed by using the gradients R of only straight lines L oriented forward in the rotational direction Dr. In the present embodiment, the X axis is defined at the center position in the circumferential direction and in the radial direction of the surface 16 of the sliding member 10 and defined along the direction tangential to the circumferential direction. The measured distance of the X axis is set at 5 mm. The number of locations, the positions, the direction, and the distance in the measurement can be arbitrarily adjusted depending upon the application of the sliding member 10.

The gradients R of the straight lines L set as described above are classified as follows:

Ra: R<0.02;
Rb: 0.02≤R≤0.04; and
Rc: 0.04<R.

That is, the straight lines L are obtained in association with all the recesses 21 and protrusions 22 of the shape line C. Among the gradients R of the straight lines L created in association with the recesses 21 and protrusions 22, gradients R greater than or equal to 0.02 but smaller than or equal to 0.04 are classified into Rb, gradients R smaller than 0.02 are classified into Ra, and gradients R greater than 0.04 are classified into Rc.

The frequencies of occurrence of the thus classified Ra, Rb, and Rc in the present embodiment satisfy $$L(Ra)+L(Rb) \geq 50\% \qquad (1).$$

When the gradients R of the straight lines L formed in association with the recesses 21 and protrusions 22 of the shape line C satisfy Expression (1) as described above, the friction between the sliding member 10 and the shaft member 13, which is the counterpart member, decreases. Among the gradients R of the straight lines L, Ra, which is smaller than 0.2, and Rb, which ranges from 0.02 to 0.04, account for at least 50% of the whole of gradients R.

The relationship between Ra and Rb is preferably $$L(Rb)/(L(Ra)+L(Rb)) \geq 50\% \qquad (2).$$

That is, the straight lines L each having a gradient R of Rb preferably occupy at least 50% of the total number of the straight lines classified into Ra and Rb. As described above, it is preferable to have large proportion of straight lines L having gradients R classified into Rb among the straight lines L having gradients R classified into Ra, Rb, and Rc.

Further, the frequencies of occurrence of Ra, Rb, and Rc preferably satisfy the following when the total number of the straight lines L having determined gradients R corresponds to 100%:

$$10\% \leq L(Ra) \leq 40\% \qquad (3);$$

$$40\% \leq L(Rb) \leq 90\% \qquad (4); \text{ and}$$

$$0\% \leq L(Rc) \leq 20\% \qquad (5).$$

The straight lines L each having a gradient R of Rb preferably account for the majority of the straight lines L, as described above.

As described above, greater gradients R of the straight lines L that connect the bottoms 31 of the recesses 21 and the peaks 32 of the protrusions 22 to each other tend to allow a lubricant for lubrication held in the recesses 21 to remain by a larger amount. This appears to be advantageous from a viewpoint of facilitating supply of lubricant to the slide surface when an internal combustion engine or the like starts. When the gradients R are too large, however, the protrusions having the too large gradients R tend to prevent the lubricant held in the recesses 21 from moving. This tends to prevent the lubricant held in the recesses 21 from being smoothly supplied to the peaks 32 of the protrusions 22 and inhibit formation of an oil film when the engine starts. Further, when the gradients R are too large, the contact resistance between the resin coating layer 12 and the shaft member 13, which is the counterpart member, increases, and the friction therebetween increases accordingly.

On the other hand, smaller gradients R of the straight lines L tend to cause the amount of lubricant held in the recesses 21 to be more insufficient. That is, when the gradients R are too small, the inclining surfaces that connect the recesses 21 and the protrusions 22 to each other and that correspond to the straight lines L in FIG. 6 diagrammatically illustrating the cross-sectional shape of the resin coating layer 12, have gentle gradients. That is, the angles between the inclining surfaces that connect the recesses 21 and the protrusions 22 to each other and the protrusion/recess average line Lv become smaller. Therefore, it becomes difficult to hold the lubricant in the recesses 21 and the lubricant becomes prone to flow out along the slide surface. As a result, it is difficult for the recesses 21 having the too small gradients R to hold sufficient amount of lubricant. To avoid such problem, controlling the gradients R of the straight lines L as indicated by Expressions (1) to (5) described above allows the states in which the lubricant in the recesses 21 is held and supplied to be controlled. As a result, the lubricant can be supplied appropriately to the slide portion between the sliding member 10 and the shaft member 13 and thereby reduce friction therebetween.

EXAMPLES

Examples of the present embodiment will be described below.

First, a description will be given on methods for manufacturing Examples 1 to 17 and Comparative Examples 1 to 3 presented in FIG. 7.

The resin coating layer 12 is formed on the slide surface of the bearing alloy layer 11 molded into a predetermined shape. Paint that forms the resin coating layer 12 is made of a resin which serves as a binder material and to which an additive, primarily a solid lubricant, is added. The binder material of the resin coating layer 12 is, for example, one or more of polyamide imide, polybenzimidazole, polyimide, polyamide, and other known resins. The binder material may be a polymer alloy. The solid lubricant is one or more of molybdenum disulfide, graphite, boron nitride, polytetrafluoroethylene, and other known compounds. Other additives such as calcium carbonate, aluminum oxide, silicon dioxide, and other known compounds may be added as well. In the present example, polyamide imide and polyamide are used as the binder material, and molybdenum disulfide is used as the solid lubricant. It is possible to control the minute protrusions and recesses on the surface of the resin coating layer 12 by controlling the state of aggregation of the additive particles that are dispersed in the resin binder material.

For example, the paint that forms the resin coating layer 12 is filled in the space between a pair of surface members the distance between which is arbitrarily adjustable. Rotating at least one of the pair of surface members produces shear force acting on the paint filled in the space between the surface members. The shear force changes the aggregation state of the additive particles contained in the paint. As an example, the distance between the pair of the surface members is set at 10 µm, and the number of revolutions of the surface members relative to each other is set at 2000 rpm. Controlling the distance between the surface members and the number of relative revolutions allows the aggregation state of the additive particles contained in the paint forming the resin coating layer 12 to be controlled. The time period required for control of the aggregation state is set, for example, to range approximately between 10 to 60 minutes. The shorter the process period, the less the aggregation of the additive particles tends to be eliminated. Controlling the aggregation of the additive particles as described above allows increase in the distance between the bottom 31 of a recess 21 and the peak 32 of a protrusion 22 in the Y-axis direction and increase in the gradient R. On the other hand, the longer the process period, the more the aggregation of the additive particles is eliminated and fragmented. Controlling the aggregation of the additive particles as described above allows decrease in the distance between the bottom 31 of a recess 21 and the peak 32 of a protrusion 22 in the Y-axis direction and decrease in the gradient R. As described above, in addition to the distance between the surface members and the number of relative revolutions, controlling the process time for which the dispersion process is carried out allows the shape of the surface of the resin coating layer 12 to be controlled. The control of the aggregation by using shear force is an example of pre-processing of the paint that forms the resin coating layer 12. The method for controlling the aggregation of the additive particles is not limited to the method described above and but may adopt any other method.

The pre-processed paint is applied onto the slide surface of the bearing alloy layer 11. At this point, the paint is applied onto the bearing alloy layer 11 by using a known method, such as spraying, rolling, padding, and screening. When the applied paint cures, the resin coating layer 12 is formed on the slide surface of the bearing alloy layer 11. The resin coating layers in the Examples and Comparative Examples, which will be described later, are each formed to an average thickness of 5 µm.

Next, a description will be given on experiment conditions.

In the present embodiment, coefficient of friction is determined by using a thrust tester. Specifically, a thrust washer formed of a sliding member 10 in each of Examples and Comparative Examples is placed in the thrust tester. The sliding member 10 placed in the thrust tester slides on a steel counterpart member to which a preset test load is applied. The coefficient of friction is calculated based on the test load and the frictional force produced between the sliding member 10 and the counterpart member and measured in the sliding action.

Results of the test will next be described with reference to FIG. 7.

Expression (1) is satisfied in Examples 1 to 5. In the case where the gradients R of the straight lines L are small, that is, many of the gradients R are smaller than or equal to 0.04 as in Examples 1 to 5, an oil film is readily formed, and the contact resistance is therefore reduced. The coefficient of friction can therefore be reduced. In contrast, none of Comparative Examples 1 to 3 satisfy Expression (1). It is therefore apparent that lower coefficients of friction are achieved in Examples 1 to 5 compared to Comparative Examples 1 to 3.

In Examples 6 to 10, Expression (2) as well as Expression (1) is further satisfied. In Examples 6 to 10, in which Expression (2) is satisfied, an oil film is more readily formed, and the coefficient of friction is therefore further reduced.

In Examples 11 to 17, Expressions (3) to (5) as well as Expressions (1) and (2) are further satisfied. In Examples 11 to 17, in which Expressions (3) to (5) are satisfied, an oil film is more readily formed, and the coefficient of friction is therefore further reduced.

The present invention described above is not limited to the embodiment described above and can be implemented in a variety of other embodiments to the extent that they do not depart from the substance of the present invention.

The present embodiment has been described through an example in which the sliding member 10 is used as a thrust washer. The sliding member 10, when used as a thrust washer, reduces the coefficient of friction and therefore reduces friction against the counterpart member. Similarly, the sliding member 10 is not necessarily used as a thrust washer and can be used as sliding members 10 in other forms, such as a bearing apparatus that supports rotation and can provide the same advantage. The present embodiment has been further described through an example in which the resin coating layer 12 has a macroscopically uniform thickness. The resin coating layer 12 does not necessarily have a macroscopically uniform thickness and may, for example, be thicker in a central portion than both ends in the radial direction. Further, the base layer 11 may be provided with a groove, a hole, or any other indent. In this case, a surface that does not directly come into contact with a counterpart member may also be provided with the resin coating layer 12. Further, in the case where the base layer 11 is provided with an indent, the resin coating layer 12 may be provided only in the vicinity of the corner of the indent, or a portion of the resin coating layer 12 in the vicinity of the corner of the indent may have an increased thickness.

The invention claimed is:

1. A sliding member including a base layer and a resin coating layer provided on a slide surface of the base layer,
    wherein a shape line is so defined as to represent a shape of a surface of the resin coating layer disposed on a side opposite the base layer by using an X-Y coordinate system formed of an X axis representing a position between arbitrary two points on the surface and a Y axis perpendicular to the X axis and representing a thickness direction of the resin coating layer, the shape line is divided by an imaginary straight line parallel to the X axis to set recessed regions that protrude downward from the imaginary straight line and protruding regions that protrude upward from the imaginary straight line, and the imaginary straight line so positioned that a sum of areas of the recessed regions is equal to a sum of areas of the protruding regions is defined as an protrusion/recess average line,
    regions that protrude downward from the protrusion/recess average line are defined as recesses, and regions that protrude upward from the protrusion/recess average line are defined as protrusions,
    for each set of a recess out of the recesses and a protrusion out of the protrusions that are adjacent to each other with an intersection of the shape line and the protrusion/recess average line sandwiched between the recess and the protrusion, a bottom that is a lowest point of the recess and a peak that is a highest point of the protrusion are connected to each other with an imaginary straight line L, and a gradient of the straight line L is defined as a gradient R,
    a determined value of the gradient R is classified into
    Ra: $R<0.02$,
    Rb: $0.02 \leq R \leq 0.04$, and
    Rc: $0.04<R$,
    and assuming that a total number of the straight lines L with the gradients R thereof calculated corresponds to 100%, $L(Ra)+L(Rb) \geq 50\%$ is satisfied.

2. The sliding member according to claim 1, wherein $L(Rb)/(L(Ra)+L(Rb)) \geq 50\%$ is satisfied.

3. The sliding member according to claim 2, wherein assuming that the total number of the straight lines L with the gradients R thereof calculated corresponds to 100%, $10\% \leq L(Ra) \leq 40\%$, $40\% \leq L(Rb) \leq 90\%$, and $0\% \leq L(Rc) \leq 20\%$ are satisfied.

4. An internal combustion engine including the sliding member according to claim 3.

5. An internal combustion engine including the sliding member according to claim 2.

6. The sliding member according to claim 1, wherein assuming that the total number of the straight lines L with the gradients R thereof calculated corresponds to 100%, $10\% \leq L(Ra) \leq 40\%$, $40\% \leq L(Rb) \leq 90\%$, and $0\% \leq L(Rc) \leq 20\%$ are satisfied.

7. An internal combustion engine including the sliding member according to claim 6.

8. An internal combustion engine including the sliding member according to claim 1.

9. A resin coating layer disposable on a slide surface of a base layer of a sliding member, comprising:
    a first surface; and
    a second surface opposite to the first surface, wherein the second surface abuts the slide surface of the base layer;
    wherein the first surface is defined to represent a shape defining a shape line such that, by using an X-Y coordinate system formed of an X axis representing a position between two arbitrary points on the surface and a Y axis perpendicular to the X axis and representing a thickness direction of the resin coating layer, the shape line is divided by a protrusion/recess average line, parallel to the X axis,
    wherein the shape line defines recesses into the first surface that protrude downwardly from the protrusion/recess average line,
    wherein the shape line defines protrusions on the first surface that protrude upwardly from the protrusion/recess average line,
    wherein the protrusion/recess average line is positioned so that a sum of areas of the recesses equals a sum of areas of the protrusions,
    wherein, for each adjacent recess and protrusion, a bottom defines a lowest point of the recess, a peak defines a highest point of the protrusion, and a straight line L connects the bottom to the peak, and wherein the straight line L defines a gradient R with a predetermined value satisfying the following Ra: R<0.02,
Rb: 0.02≤R≤0.04,
Rc: 0.04<R, and
assuming that a total number of the straight lines L with the gradients R corresponds to 100%, L(Ra)+L(Rb) 50%.

10. The resin coating layer according to claim 9, wherein the resin coating layer comprises paint.

11. The resin coating layer according to claim 9, wherein L(Rb)/(L(Ra)+L(Rb))≥50% is satisfied.

12. The resin coating layer according to claim 11, wherein the resin coating layer comprises paint.

13. The resin coating layer according to claim 11, wherein, assuming that a total number of the straight lines L with the gradients R corresponds to 100%, $10\% \leq L(Ra) \leq 40\%$, $40\% \leq L(Rb) \leq 90\%$, and $0\% \leq L(Rc) \leq 20\%$ are satisfied.

14. The resin coating layer according to claim 13, wherein the resin coating layer comprises paint.

15. The resin coating layer according to claim 9, wherein, assuming that a total number of the straight lines L with the gradients R corresponds to 100%, $10\% \leq L(Ra) \leq 40\%$, $40\% \leq L(Rb) \leq 90\%$, and $0\% \leq L(Rc) \leq 20\%$ are satisfied.

16. The resin coating layer according to claim 15, wherein the resin coating layer comprises paint.

* * * * *